United States Patent [19]

Koriyama

[11] Patent Number: 5,463,515
[45] Date of Patent: Oct. 31, 1995

[54] MAGNETIC HEAD SUPPORTING STRUCTURE WITH A BEARING FIXED TO A RADIALLY THIN WALL PART OF A SLEEVE LOCATED BETWEEN AN ARM HOLDER AND THE BEARING

[75] Inventor: Hiroshi Koriyama, Tokyo, Japan

[73] Assignee: NEC Corporation, Tokyo, Japan

[21] Appl. No.: 159,225

[22] Filed: Nov. 30, 1993

[30] Foreign Application Priority Data

Nov. 30, 1992 [JP] Japan ..................... 4-343446

[51] Int. Cl.⁶ ..................... G11B 5/55; G11B 5/012
[52] U.S. Cl. ..................... 360/106; 360/98.01
[58] Field of Search ..................... 360/106, 104, 360/97.03, 98.01, 98.07, 99.08, 105; 369/244, 250, 255; 384/276, 278; 310/90

[56] References Cited

U.S. PATENT DOCUMENTS

| | | | |
|---|---|---|---|
| 4,691,258 | 9/1987 | Kobayashi et al. | 360/105 |
| 5,099,374 | 3/1992 | Ohkita et al. | 360/106 |
| 5,146,450 | 9/1992 | Brooks et al. | 360/99.08 |
| 5,251,085 | 10/1993 | Morris et al. | 360/106 |
| 5,301,078 | 4/1994 | Makino et al. | 360/106 |
| 5,315,465 | 5/1994 | Blanks | 360/106 |

*Primary Examiner*—Stuart S. Levy
*Assistant Examiner*—Craig A. Renner

[57] ABSTRACT

The magnetic disk unit has a cylindrical sleeve disposed between a plurality of bearings and an arm holder for magnetic heads rotatably supported by a head rotating shaft disposed in parallel with a disk rotating shaft for magnetic disks via the bearings. This sleeve forms a gap with the inner periphery of the arm holder to absorb a difference of thermal distortion in the radial direction of the arm holder and the bearings. Thus, thermal offtrack characteristics can be improved significantly.

20 Claims, 5 Drawing Sheets

THERMAL OFFTRACK (OUTERMOST / PERIPHERY)

MAGNETIC HEAD SUPPORTING STRUCTURE WITH A BEARING FIXED TO A RADIALLY THIN WALL PART OF A SLEEVE LOCATED BETWEEN AN ARM HOLDER AND THE BEARING

BACKGROUNDS OF THE INVENTION

1. Field of the Invention

This invention relates to a magnetic disk unit, and particularly to a magnetic disk unit capable of making high precision reading and writing by magnetic heads with a thermal offtrack minimized.

2. Description of the Related Art

This type of magnetic disk unit generally has a magnetic head mounted on a rotary carriage and floats the magnetic head from the surface of a magnetic disk by an air pressure generated by the magnetic disk revolving at a high speed to read or write magnetic record from or to the magnetic disk.

A carriage of the magnetic disk unit is designed to read a positioning pattern written in the surface of a magnetic disk with a servo head and to form a servo loop for positioning.

Such a magnetic disk unit has been improved to enhance recording density. Methods for enhancing the recording density include a method to increase a track bit density and a method to increase a track density by reducing a track width. In these years, the track width has been reduced to about 10 micrometers.

FIG. 4 shows an example of a conventional magnetic disk unit. In FIG. 4, magnetic disks are rotatably supported on a base 43 with both ends of a disk rotating shaft 42 via a spindle hub 44 and bearings 45a, 45b. On the other hand, a plurality of magnetic heads 49 which are disposed to face the magnetic disks 41 are supported by an arm holder 52. The arm holder 52 is fixed to bearings 54a, 54b and rotatably supported by a head rotating shaft 53 via the bearings 54a, 54b. And, the magnetic heads 49 can be driven to rotate by a torque generated by a magnetic circuit 57.

The magnetic heads 49 consists of servo heads 48 used for positioning and data heads 47 for reading and writing data. The arm holder 52 has a plurality of arms 50 which support the data heads 47 and the servo heads 48. The servo head 48 faces a disk surface 41a set with a positioning track having a positioning data written. Data other than the positioning data is not written in the positioning track of the disk surface 41a. In the magnetic disk unit shown in FIG. 4, the bottom face of the third disk from the top is used as the disk surface 41a for setting the positioning track. It is optional wherever the positioning track is set and, the position of the servo head 48 is fixed accordingly.

In these years, with the spread of computers, their setting environments have become diversified. Therefore, a temperature in the environment where a computer is set may largely vary depending on when data is written or read. In such a case, there is a disadvantage that information cannot be read correctly because the position of the data head 47 moves out of the track which is positioned by the servo head 48, or the so-called offtrack takes place, due to thermal expansion of individual component members of the unit.

The causes of the offtrack are considered to be as follows.

Specifically, in a conventional magnetic disk unit, a material for the arm holder 52 supporting the servo head 48 and the data head 47 is aluminum or magnesium which is inexpensive and light, and has suitable strength. As to a material for the outer ring of the bearings 54a, 54b, ball-bearing steel or martensite-based stainless steel is used to enhance accuracy.

In case of contacting sections of the arm holder 52 and the bearings 54a, 54b, the inner diameter size of the arm holder 52 and the outer diameter size of the outer ring of the bearings 54a, 54b are increased due to thermal expansion when a temperature of the environment in which the magnetic disk unit is installed increases. But, the ball-bearing steel or martensite-based stainless steel which is the material for the outer ring of the bearings 54a, 54b has a coefficient of linear expansion which is about half of that of the aluminum or magnesium which is the material for the arm holder 52, so that the bearings 54a, 54b are not as largely deformed thermally as the arm holder 52. Therefore, the arm holder 52 is pulled in a direction (inward in the radial direction of the bearings 54a, 54b) that expansion is prevented by the bearings 54a, 54b, at a position that the bearings 54a, 54b are fixed. Thus, the arm holder 52 is deformed as a whole because distortion is applied in the same direction as the radial direction of the bearings 54a, 54b.

Accordingly, the arm 50, which is at a position where the arm holder 52 is in contact with the bearings 54a, 54b, is particularly largely deformed in the radial direction of the bearings 54a, 54b, i.e., in a direction causing an offtrack, as compared with the arm 50 at another position. Therefore, as shown in the thermal offtrack characteristics of FIG. 5, the data head 47, which is mounted on the arm 50 at a position to contact with the bearings 54a, 54b, is largely displaced, resulting in causing an offtrack.

SUMMARY OF THE INVENTION

An object of this invention is to provide a magnetic disk unit which is free from the aforementioned existing drawbacks and can remedy the thermal offtrack by, in case of thermal expansion of an arm holder and bearings, absorbing distortion caused by the thermal expansion, to make the deformation of the arm holder same with those of a servo arm and a data arm so as to minimize a relative position change of the servo head and the data head.

The magnetic disk unit of this invention according to a preferable embodiment to accomplish the above object comprises:

magnetic disks which are rotatably supported by a disk rotating shaft, an arm holder which is almost cylindrical, has head arms corresponding to the above each magnetic disk in the axial direction, and is rotatably supported by a head rotating shaft which is disposed in parallel with the above disk rotating shaft with a plurality of bearings disposed therebetween, magnetic heads which are mounted on arms of the above arm holder and disposed to face the surfaces of the above magnetic disks, and a cylindrical sleeve which is disposed between the above bearings and the above arm holder and forms a gap with the inner periphery of the above arm holder to absorb a difference of thermal distortions in the radial direction of the above arm holder and the bearings.

In the magnetic disk unit of this invention according to a preferable embodiment, the above sleeve has thick wall parts to be fixed to the inner periphery of the above arm holder and a thin wall part to form a gap with the inner periphery of the above arm holder, and the outer peripheries of the above bearings are fixed to the above thin wall part.

In the magnetic disk unit of this invention according to a preferable embodiment, the above sleeve is formed in a single cylindrical shape having substantially the same length with the above arm holder in the axial direction, has thick wall parts at its top and bottom ends to be fixed to the inner periphery of the above arm holder and a thin wall part to form a gap with the inner periphery of the above arm holder, and the outer peripheries of the above bearings are fixed to the above thin wall part.

In the magnetic disk unit of this invention according to a preferable embodiment, the above sleeve is formed in a cylindrical shape with a length in the axial direction shorter than the above arm holder and disposed in plural numbers between the above bearings and the above arm holder corresponding to the above respective bearings in plural numbers, and has thick wall parts to be fixed to the inner periphery of the above arm holder and a thin wall part to form a gap with the inner periphery of the above arm holder, and the outer peripheries of the above bearings are fixed to the above thin wall part.

In the magnetic disk unit of this invention according to a preferable embodiment, the above sleeve is made of a material which has the same coefficient of linear expansion with that of the above arm holder.

In the magnetic disk unit of this invention according to a preferable embodiment, the above sleeve has a wall thickness in an inevitable minimum size to bear a stress generated by distortion due to a difference of expansion according to a temperature change in the above sleeve and the above bearings and a stress generated during seeking.

In the magnetic disk unit of this invention according to a preferable embodiment, the above sleeve is made of material whose coefficient of linear expansion falls between those of the above arm holder and the above bearings.

The magnetic disk unit of this invention according to a preferable embodiment comprises:

magnetic disks which are rotatably supported by a disk rotating shaft, an arm holder which is almost cylindrical, has head arms corresponding to the above each magnetic disk in the axial direction, and is rotatably supported by a head rotating shaft which is disposed in parallel with the above disk rotating shaft with a plurality of bearings disposed therebetween, magnetic heads which are mounted on arms of the above arm holder and disposed to face the surfaces of the above magnetic disks, and a cylindrical sleeve which is disposed between the above bearings and the above arm holder and forms a gap with the inner periphery of the above arm holder to absorb a difference of thermal distortions in the radial direction of the above arm holder and the bearings, the above sleeve having thick wall parts to be fixed to the inner periphery of the above arm holder and a thin wall part to form a gap with the inner periphery of the above arm holder, and the outer peripheries of the above bearings being fixed to the above thin wall part, and the above sleeve being formed in a single cylindrical shape having substantially the same length with the above arm holder in the axial direction, and having its both ends formed in the above thick wall part and its middle part formed in the above thin wall part.

Other objects, features and advantages of the./ present invention will become clear from the description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
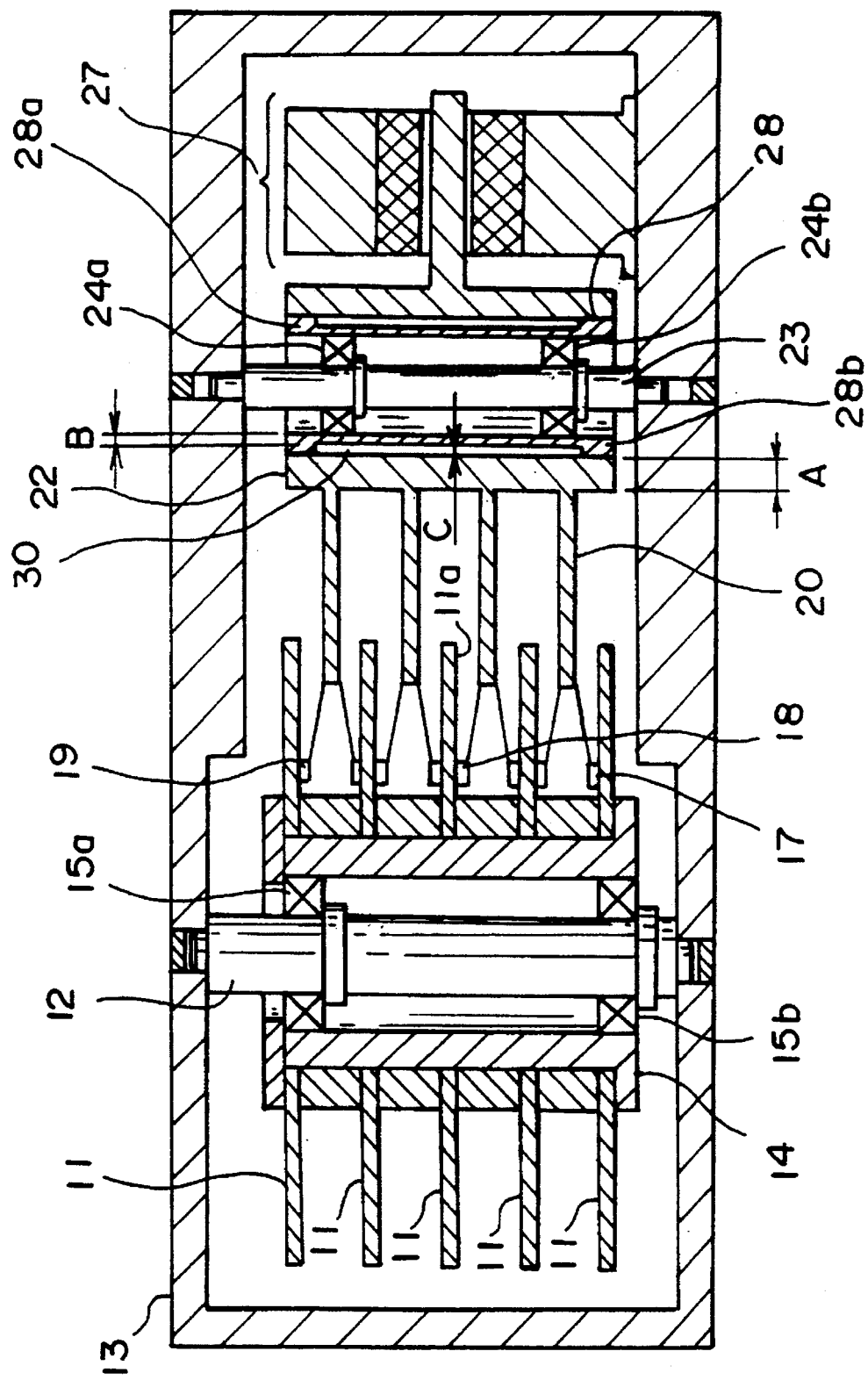
FIG. 1 is a longitudinal sectional view showing a magnetic disk unit according to the first embodiment of this invention.

Preferable embodiments of this invention will be described in detail with reference to the attached drawings. FIG. 1 shows a magnetic disk unit of the first embodiment of this invention.

As shown in FIG. 1, magnetic disks 11 are rotatably supported on a base 13 with both ends of a disk rotating shaft 12 via a spindle hub 14 and bearings 15a, 15b. And, a plurality of magnetic heads 19, which are disposed to face the magnetic disks 11, are supported by an arm holder 22. The arm holder 22 is rotatably supported by a head rotating shaft 23 via a pair of bearings 24a, 24b disposed in a vertical relation. And, the magnetic heads 19 can be driven for rotation by a torque generated by a magnetic circuit 27.

And, the magnetic heads 19 consist of servo heads 18 used for positioning and data heads 17 for data reading and writing. The arm holder 22 has a plurality of arms 20 to support the data heads 17 and the servo heads 18.

The servo heads 18 faces a disk surface 11a set with a positioning track having a positioning data written among the disks 11. Data other than the positioning data is not written in the positioning track of the disk surface 11a. In this embodiment, the bottom face of the third disk from the top is used as the disk surface 11a for setting the positioning track.

Between the arm holder 22 and the bearings 24a, 24b for rotatably supporting the arm holder 22, a pipe sleeve 28 is disposed fixed to the arm holder 22 by shrink fitting or bonding.

The sleeve 28 has thick wall parts 28a, 28b having a specified width which are formed by increasing the wall thickness of its top and bottom ends. Therefore, a portion between the thick wall parts 28a, 28b of the sleeve 28 is formed to have a wall thickness smaller than the thick wall parts 28a, 28b. The outer periphery sections of the thick wall parts 28a, 28b are fixed to the inner periphery of the arm holder 22. And, the outer periphery sections of the bearings 24a, 24b are fixed to the inner periphery of the sleeve 28.

The wall thickness of the sleeve 28 is desirably formed to have an inevitable minimum size to bear a stress generated by distortion due to a difference of expansion according to a temperature change in the sleeve 28 and the bearings 24a, 24b and a stress generated during seeking by an actuator. Thus, distortion of the arm holder 22 can be minimized.

Disposition of the above shaped sleeve 28 permits formation of a gap 30 along the entire outer periphery between the sleeve 28 and the arm holder 22 due to a difference of the wall thickness between the thick wall parts 28a, 28b and the thin wall part therebetween excepting the portions of the thick wall parts 28a, 28b. This gap 30 extends to sections where the sleeve 28 contacts with the bearings 24a, 24b. In other words, the gap 30 is positioned at the outer periphery of the parts where the sleeve 28 contacts with the bearings 24a, 24b.

Thus, a difference of thermal distortion in the radial direction of the arm holder 22 and the bearings 24a, 24b generated owing to a temperature change is absorbed by the gap 30 of the sleeve 28. Therefore, the thermal distortion of the bearings 24a, 24b does not directly affect the arm holder 22.

Although the sleeve 28 itself is affected by the thermal distortion of the bearings 24a, 24b, the relative positional displacement of the servo heads 18 and the data heads 17, or the offtrack, which is caused by the thermal distortion of the arm holder 22, can be directly reduced relatively easily by analyzing the material, size and shape of the sleeve 28 and its contact part with the arm holder 22 by the finite element method so as to optimize them.

However, the disposition of the sleeve 28 may result in a bimetal action which is generated by a difference of thermal distortion between the sleeve 28 and the arm holder 22 and a difference of thermal distortion in the axial direction between these members to deform the arm holder 22. Therefore, it is necessary to remove this disadvantage effectively.

As a preferable embodiment to minimize the deformation of the arm holder 22 which may be caused by the bimetal action due to a difference of thermal distortion in the axial direction of the bearings 24a, 24b and the sleeve 28 and a difference of thermal distortion in the axial direction, the gap 30 is disposed not only at sections contacting to the bearings 24a, 24b but also along the almost entire area in the axial direction of the sleeve 28 as shown in FIG. 1, and aluminum (A1) is used to form the arm holder 22 and the sleeve 28 and ball-bearing steel is used to form the bearings 24a, 24b.

In addition to these materials, magnesium alloy may be used for the arm holder 22, stainless steel for the bearings 24a, 24b, and magnesium alloy or stainless steel for the sleeve 28. The magnesium alloy is easily rusted but the specific gravity is small, and has the same specific strength with aluminum, so that it is useful for speeding up of the actuator. Stainless steel has characteristics that it rarely becomes rusted as compared with the ball-bearing steel and has higher strength than aluminum and magnesium alloy.

Table 1 shows setting examples of the materials for the arm holder 22, the bearings 24a, 24b and the sleeve 28 in detail.

TABLE 1

| Setting example 1 | Arm holder | Bearing | Sleeve |
|---|---|---|---|
| Material | Aluminum | Ball-bearing steel | Stainless steel |
| Coefficient of linear expansion ($10^{-6}$ [mm/°C.]) | 23.4 | 11.9 | 17.3 |
| Setting example 2 | Arm holder | Bearing | Sleeve |
| Material | Magnesium alloy | Stainless steel | Aluminum powder alloy |
| Coefficient of linear expansion | 27.0 | 10.1 | 13–18 |

TABLE 1-continued ($10^{-6}$ [mm/°C.])

In the first setting example of Table 1, aluminum having a coefficient of linear expansion of $23.4 \times 10^{-6}$ [mm/° C.] is used for the arm holder 22, ball-bearing steel having a coefficient of linear expansion of $11.9 \times 10^{-6}$ [mm/° C.] for the bearings 24a, 24b, and stainless steel having a coefficient of linear expansion of $17.3 \times 10^{-6}$ [mm/° C.] for the sleeve 28. In the second setting example, magnesium alloy having a coefficient of linear expansion of $27.0 \times 10^{-6}$ [mm/° C.] is used for the arm holder 22, stainless steel having a coefficient of linear expansion of $10.1 \times 10^{-6}$ [mm/° C.] for the bearings 24a, 24b, and aluminum powder alloy for the sleeve 28. And, the aluminum powder alloy for the sleeve 28 used in the second setting example has its silicon content adjusted suitably to vary its coefficient of linear expansion in the range of from $13.0 \times 10^{-6}$ [mm/° C.] to $18.0 \times 10^{-6}$ [mm/° C.].

As seen in the setting examples of Table 1, distortion due to a difference of expansion owing to a temperature change generated between the arm holder 22 and the sleeve 28 and between the sleeve 28 and the bearings 24a, 24b can be minimized by adjusting a coefficient of linear expansion of the sleeve 28 to a value falling in substantially the middle between the coefficients of linear expansion of the materials for the arm holder 22 and the bearings 24a, 24b. Thus, extreme thermal distortion due to a temperature change can be prevented from being applied to the arm holder 22 and much better thermal offtrack characteristics can be obtained.

And, the materials for the sleeve 28 are not limited to those shown in Table 1. For example, any material having the same coefficient of linear expansion with that of the arm holder 22 may be selected. In this case, good thermal offtrack characteristics can also be obtained.

Figure 3:
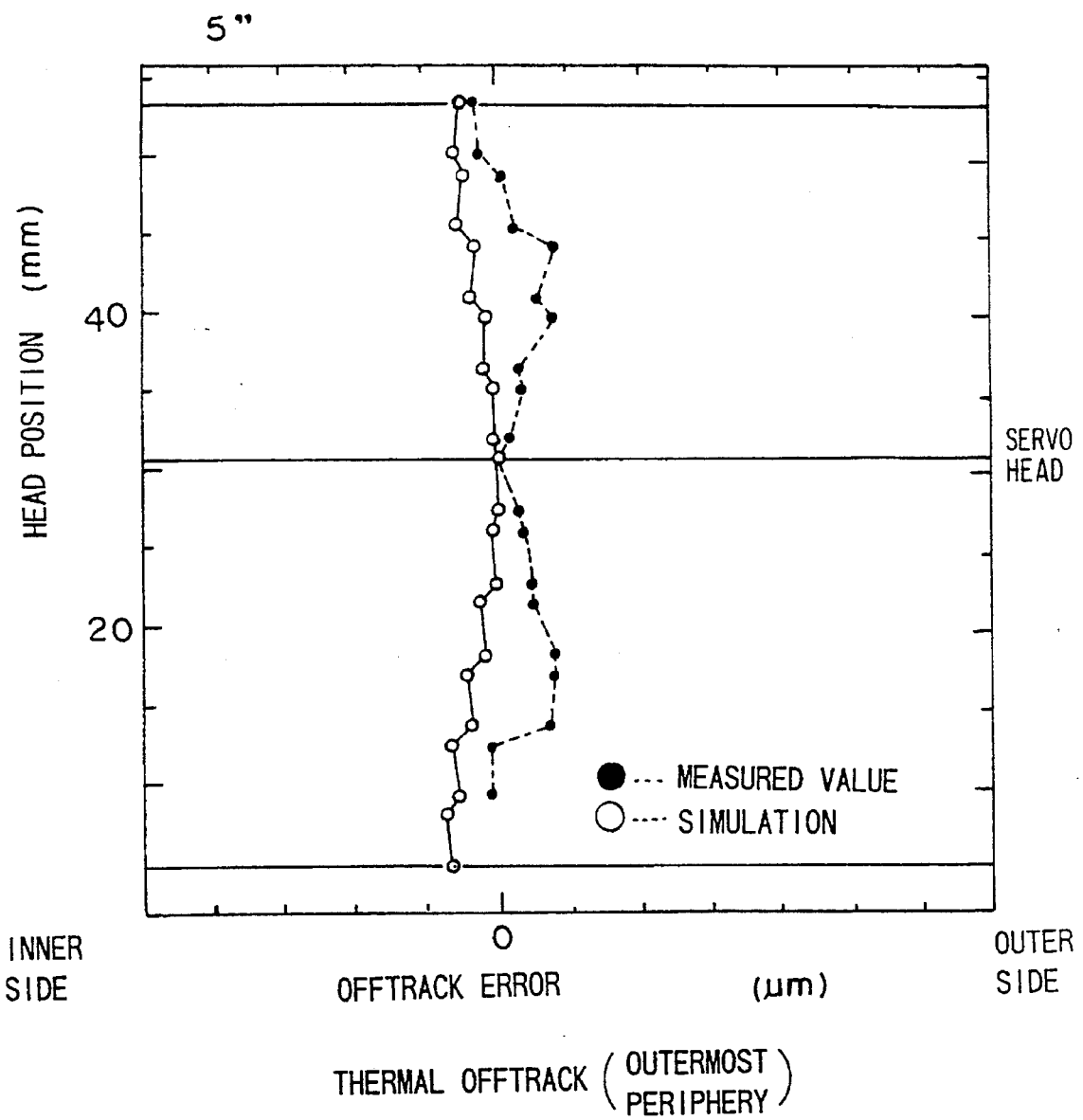
FIG. 3 is a chart showing thermal offtrack characteristics of this invention.
Figure 4:
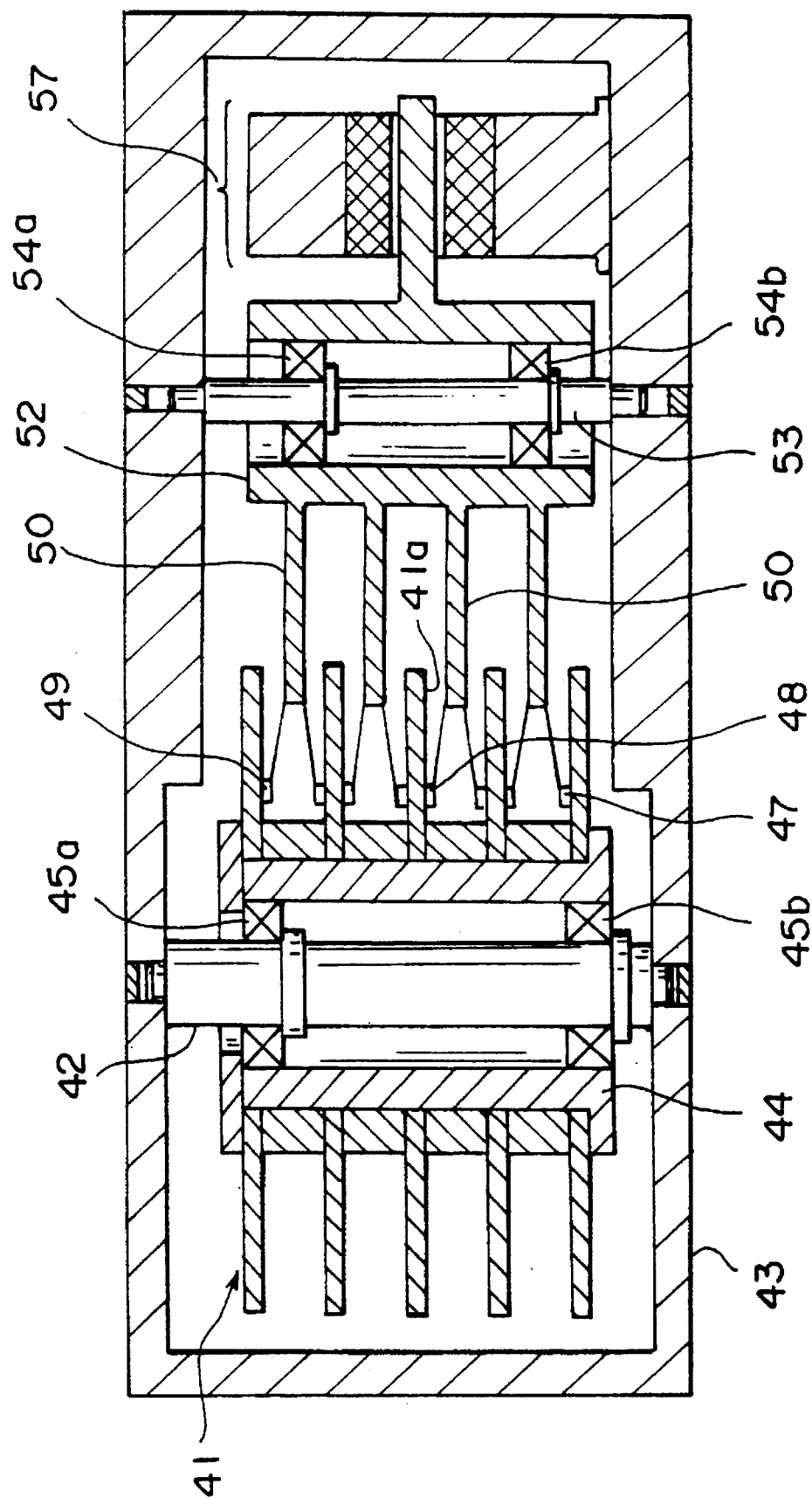
FIG. 4 is a longitudinal sectional view showing a conventional magnetic disk unit.

FIG. 3 shows a measured example of thermal offtrack characteristics obtained when the embodiment constructed as described above is applied to a 5.25-inch hard disk drive. In this measurement, the arm 22 has a wall thickness A of 2.3 [mm], the sleeve 28 has a wall thickness B of 0.6 [mm] which is to form the gap 30, and the gap 30 has a width C of 0.1 [mm] as shown in FIG. 1. Therefore, the thickness of the thick wall parts 28a, 28b is B+C=0.7 [mm]. And, the arm holder 22 is made of aluminum alloy having a coefficient of linear expansion of $23.4 \times 10^{-6}$ [mm/° C.], the bearings 24a, 24b made of stainless steel having a coefficient of linear expansion of $11.9 \times 10^{-6}$ [mm/° C.], and the sleeve 28 made of aluminum alloy having a coefficient of linear expansion of $23.6 \times 10^{-6}$ [mm/° C.].

When the sizes and material for the sleeve 28 are selected as described above, a thermal stress applied to the sleeve 28 owing to a temperature change is 25.48 [kg/mm] at −40[° C.] and 10.66 [kg/mm] at 80 [° C.] obtained by calculating by the finite element method. Therefore, a thermal stress applied to the sleeve 28 is below the tensile strength of the sleeve 28 and is a value not causing any problem. And a stress, which is applied to the sleeve 28 owing to acceleration at a time of seeking, is very small as compared with the above thermal stress due to a temperature change. Therefore, it can be neglected.

Data was written immediately after starting (at a low temperature) the magnetic disk unit at an environment temperature of 5° C., and data was read when continuously operating (at a high temperature) at an environment temperature of 50° C.

When the thermal offtrack is generated due to the above temperature difference, data when reading is displaced from when writing, resulting in lowering of an output level. Offset was made to restore the output level thus lowered to the original output level and the offset values were plotted to obtain calculated values (white circles) according to simulation and measured values (black circles) as shown in FIG. 3.

Figure 5:
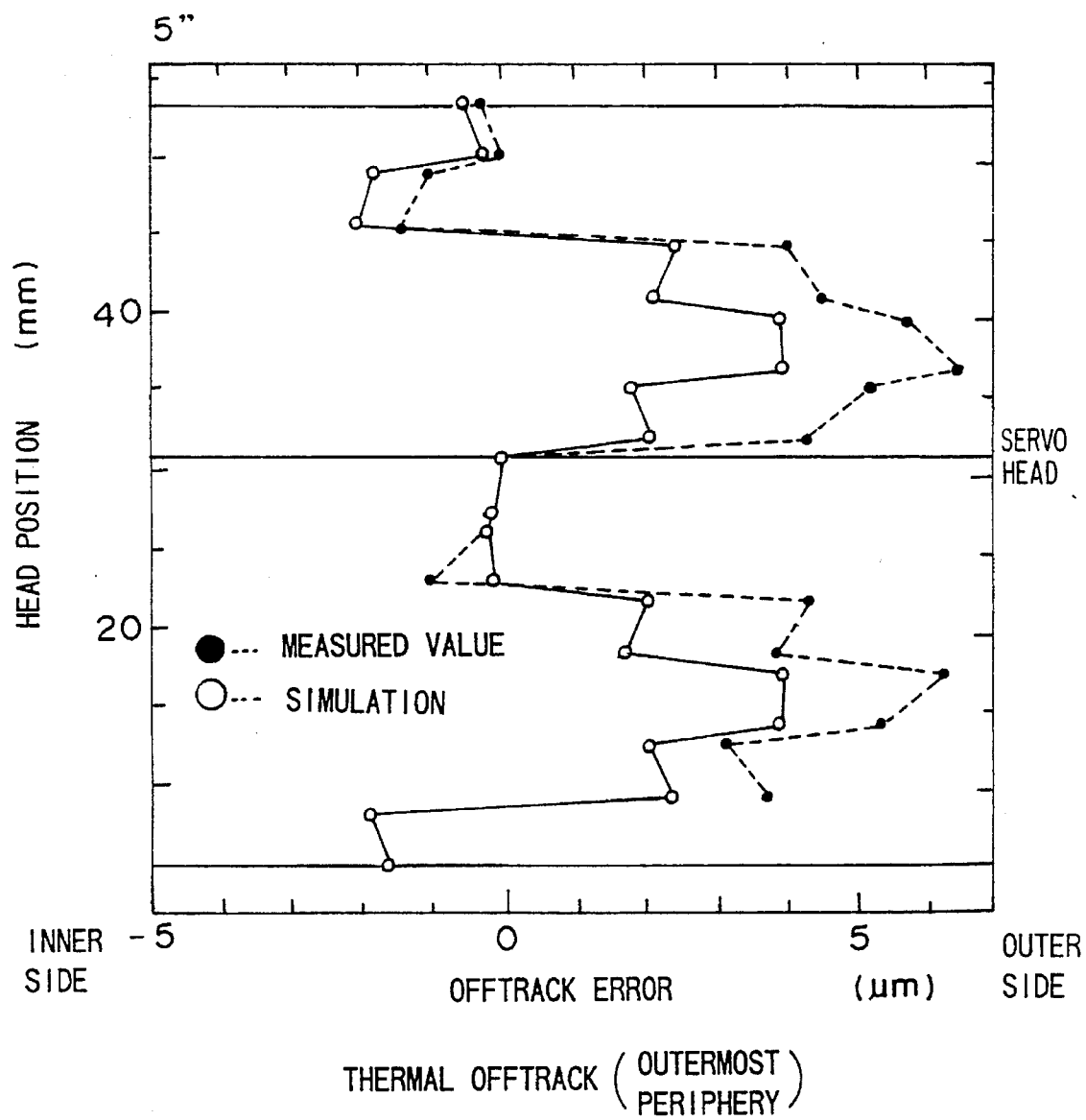
FIG. 5 is a chart showing thermal offtrack characteristics of a conventional magnetic disk unit.

FIG. 3 was compared with FIG. 5 showing offtrack errors of a conventional magnetic disk unit. In this measurement, the offtrack errors were lowered from about 5 [μm] of prior art to 1 [μm]. Thus, quite good results were obtained.

Figure 2:
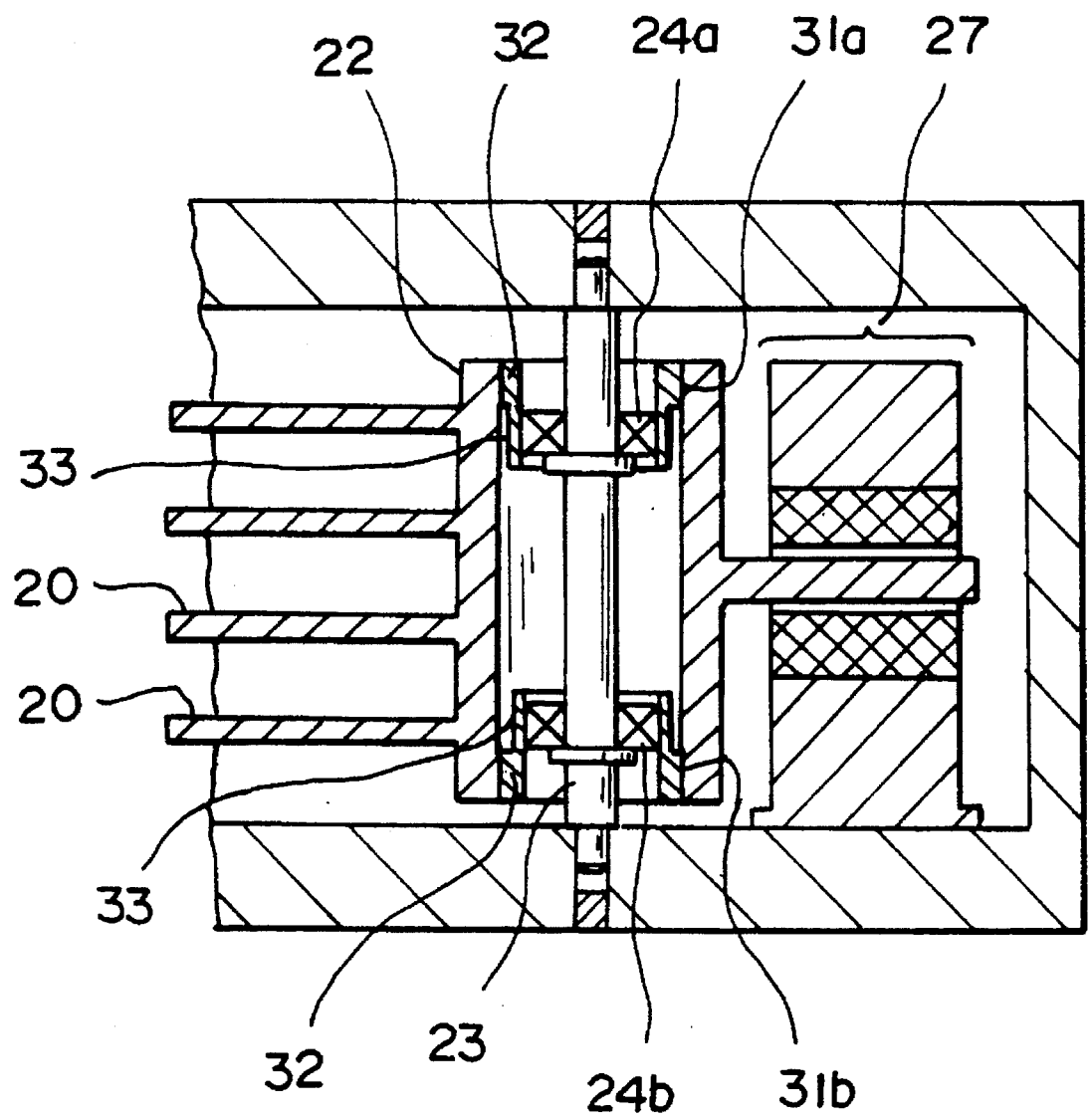
FIG. 2 is a longitudinal sectional view showing a magnetic disk unit according to the second embodiment of this invention.

Then, FIG. 2 shows a magnetic disk unit according to the second embodiment of this invention. As shown in FIG. 2, this embodiment has two sleeves 31a, 31b disposed corresponding to bearings 24a, 24b, respectively. The sleeves 31a, 31b each have the shape of a pipe and a length in the axial direction about two times of the bearings 24a, 24b, and also have a thick wall part 32 which is formed by partly increasing the thickness. The outer periphery part of the thick wall part 32 is fixed to the inner periphery of an arm holder 22. Thus, a gap 33 is formed along the entire outer periphery areas of the sleeves 31a, 32b excepting the areas of the thick wall parts 32 of the sleeves 31a, 32a. And, the outer peripheries of the bearings 24a, 24b are fixed to the inner peripheries of the sleeves 31a, 31b at the parts that the gaps 33 are formed.

Thus, the sleeves 31a, 31b are designed as independent plural parts and corresponded to the respective bearings 24a, 24b, so that a difference of thermal distortion in the radial direction of the arm holder 22 and the bearings 24a, 24b generated owing to a temperature change is absorbed by the gaps 33 of the sleeves 31a, 31b. And, since the sleeves 31a, 31b are independent parts, thermal distortion generated in the axial direction due to a temperature change depending on a difference of coefficient of linear expansion between the arm holder 22 and the sleeves 31a, 31b becomes very small. In other words, deformation due to the bimetal action is substantially nil, and better thermal offtrack characteristics than in the first embodiment can be obtained.

It is understood that in this invention, various modifications can be made in addition to the above embodiments. For example, the above first and second embodiments have been described with reference to two bearings, but this invention can also be applied to three or more bearings in the same way.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A magnetic disk unit comprising:

magnetic disks which are rotatably supported by a disk rotating shaft;

an arm holder which is almost cylindrical, and has head arms corresponding to each of said magnetic disks in the axial direction, and is rotatably supported by a head rotating shaft which is disposed in parallel with said disk rotating shaft with a plurality of bearings disposed therebetween;

magnetic heads which are mounted on the head arms of said arm holder and disposed to face the surfaces of said magnetic disks; and a cylindrical sleeve which is disposed between said bearings and said arm holder and forms a gap with the inner periphery of said arm holder to absorb a difference of thermal distortions in the radial direction of said arm holder and said bearings, wherein said sleeve has thick wall parts fixed to the inner periphery of said arm holder and a thin wall part between said thick wall parts to form the gap along the entire periphery between the thin wall part of the sleeve and the inner periphery of said arm holder, said thick wall parts each having a radial dimension larger than a radial dimension of said thin wall part, and the outer peripheries of said bearings are fixed to said thin wall part of the sleeve.

2. A magnetic disk unit as set forth in claim 1, wherein said sleeve is formed in a single cylindrical shape having substantially the same length in the axial direction as said arm holder, said thick wall parts being located at the top and bottom ends of said sleeve and being fixed to the inner periphery of said arm holder, and said thin wall part being located between the thick wall part of the top end and the thick wall part of the bottom end.

3. A magnetic disk unit as set forth in claim 2, wherein said sleeve is made of a material having the same coefficient of linear expansion as said arm holder.

4. A magnetic disk unit as set forth in claim 2, wherein said sleeve has a predetermined wall thickness, wherein said predetermined wall thickness is the minimum thickness capable of bearing a stress generated by distortion due to a difference in thermal expansion in said sleeve and said bearings and a stress generated during seeking.

5. A magnetic disk unit as set forth in claim 2, wherein said sleeve is made of a material whose coefficient of linear expansion falls in a value between those of said arm holder and said bearings.

6. A magnetic disk unit as set forth in claim 5, wherein said arm holder is made of aluminum or magnesium alloy, said bearings are made of ball-bearing steel or stainless steel, and said sleeve is made of stainless steel or aluminum powder alloy.

7. A magnetic disk unit as set forth in claim 1, wherein said sleeve is made of a material whose coefficient of linear expansion falls in a value between those of said arm holder and said bearings.

8. A magnetic disk unit as set forth in claim 7, wherein said arm holder is made of aluminum or magnesium alloy, said bearings are made of ball-bearing steel or stainless steel, and said sleeve is made of stainless steel or aluminum powder alloy.

9. A magnetic disk unit as set forth in claim 1, wherein said sleeve is made of material which has the same coefficient of linear expansion as that of said arm holder.

10. A magnetic disk unit as set forth in claim 1, wherein said sleeve has a predetermined wall thickness, wherein said predetermined wall thickness is the minimum thickness capable of bearing a stress generated by distortion due to a difference in thermal expansion in said sleeve and said bearings and a stress generated during seeking.

11. A magnetic disk unit comprising:

magnetic disks which are rotatably supported by a disk rotating shaft;

an arm holder which is almost cylindrical, and has head arms corresponding to each of said magnetic disks in the axial direction, and is rotatably supported by a head rotating shaft which is disposed in parallel with said disk rotating shaft with a plurality of bearings disposed therebetween;

magnetic heads which are mounted on the arms of said arm holder and disposed to face the surfaces of said magnetic disks; and a plurality of cylindrical sleeves which are disposed between said bearings and said arm holder and form a gap with the inner periphery of said arm holder to absorb a difference of thermal distortions in the radial direction of said arm holder and said bearings, wherein each of said sleeves is formed in a cylindrical-shape with a length in the axial direction shorter than said arm holder and disposed between a respective one of said bearings and said arm holder and has a thick wall part fixed to the inner periphery of said arm holder and a thin wall part to form the gap between the sleeve and the inner periphery of said arm holder, said thick wall parts each having a radial dimension larger than a radial dimension of each of said thin wall parts, and the outer peripheries of said bearings are fixed only to said thin wall parts of each of said sleeves.

12. A magnetic disk unit as set forth in claim 11, wherein said sleeves are made of a material whose coefficient of linear expansion falls in a value between those of said arm holder and said bearings.

13. A magnetic disk unit as set forth in claim 12, wherein said arm holder is made of aluminum or magnesium alloy, said bearings are made of ball-bearing steel or stainless steel, and said sleeves are made of stainless steel or aluminum powder alloy.

14. A magnetic disk unit as set forth in claim 11, wherein said sleeves are made of a material having the same coefficient of linear expansion as said arm holder.

15. A magnetic disk unit as set forth in claim 11, wherein each of said sleeves has a predetermined wall thickness, wherein said predetermined wall thickness is the minimum thickness capable of bearing a stress generated by distortion due to a difference in thermal expansion in said sleeves and said bearings and a stress generated during seeking.

16. A magnetic disk unit comprising:

magnetic disks which are rotatably supported by a disk rotating shaft, an arm holder which is almost cylindrical, and has head arms corresponding to each of said magnetic disks in the axial direction, and is rotatably supported by a head rotating shaft which is disposed in parallel with said disk rotating shaft with a plurality of bearings disposed therebetween, magnetic heads which are mounted on the head arms of said arm holder and disposed to face the surfaces of said magnetic disks, and a cylindrical sleeve which is disposed between said bearings and said arm holder and forms a gap with the inner periphery of said arm holder to absorb a difference of thermal distortions in the radial direction of said arm holder and said bearings, wherein said sleeve having thick wall parts fixed to the inner periphery of said arm holder and a thin wall part between said thick wall parts to form the gap along the entire periphery between the thin wall part of the sleeve and the inner periphery of said arm holder, the outer peripheries of said bearings being fixed to said thin wall part of the sleeve, said thick wall parts each having a radial dimension larger than a radial dimension of said thin wall part, and said sleeve being formed in a single cylindrical shape having substantially the same length in the axial direction as said arm holder, and having its both ends formed as said thick wall parts and its middle part formed as said thin wall part.

17. A magnetic disk unit as set forth in claim 16, wherein said sleeve is made of a material whose coefficient of linear expansion falls in a value between those of said arm holder and said bearings.

18. A magnetic disk unit as set forth in claim 17, wherein said arm holder is made of aluminum or magnesium alloy, said bearings are made of ball-bearing steel or stainless steel, and said sleeves are made of stainless steel or aluminum powder alloy.

19. A magnetic disk unit as set forth in claim 16, wherein said sleeve is made of a material having the same coefficient of liner expansion as said arm holder.

20. A magnetic disk unit as set forth in claim 16, wherein said sleeve has a predetermined wall thickness, wherein said predetermined wall thickness is the minimum thickness capable of bearing a stress generated by distortion due to a difference in thermal expansion in said sleeve and said bearings and a stress generated during seeking.

* * * * *